(No Model.)
C. LEE & C. L. LEE, Jr.
FRUIT PICKER.
No. 505,556. Patented Sept. 26, 1893.
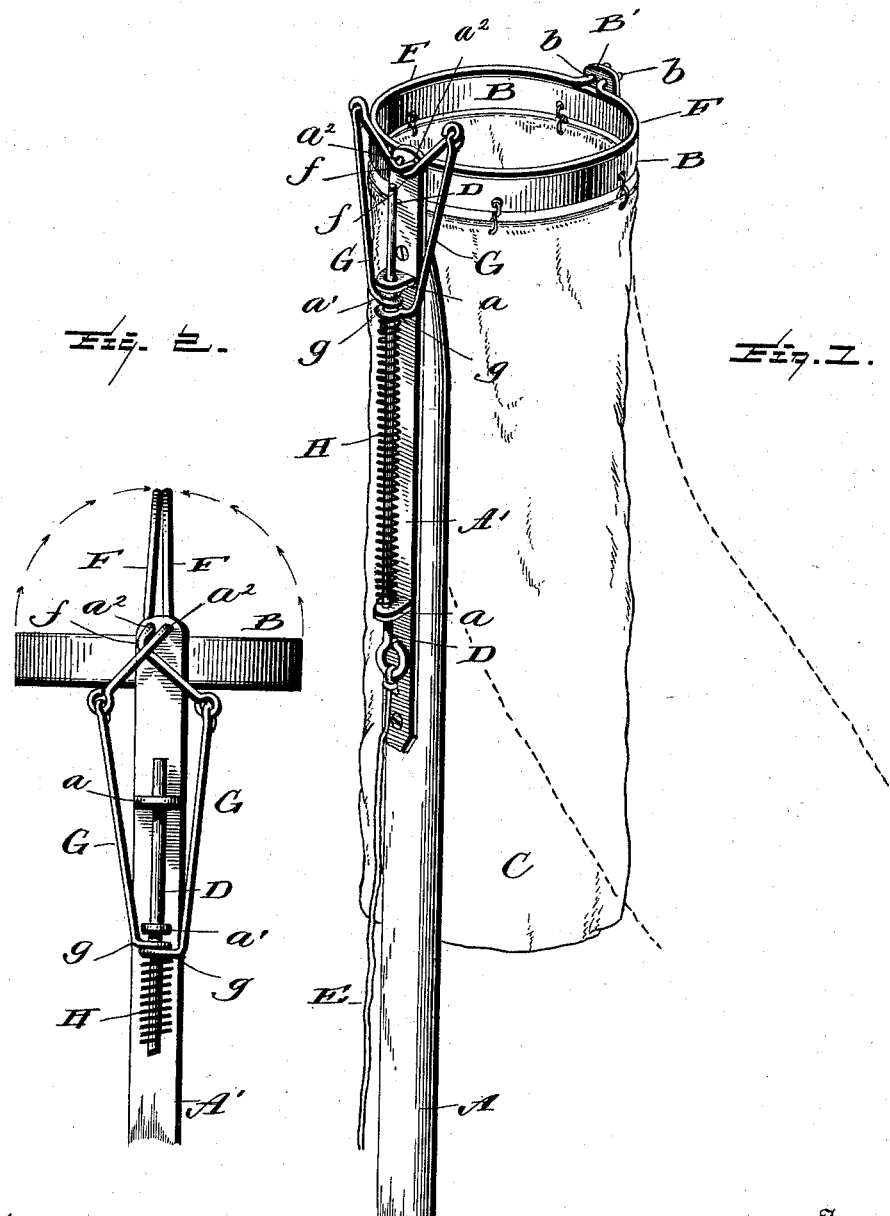
Witnesses
L. C. Hills
E. H. Bond
Inventors
Charles Lee and
Charles L. Lee, Jr.
By E. B. Stocking
Attorney

UNITED STATES PATENT OFFICE.

CHARLES LEE AND CHARLES L. LEE, JR., OF BURBANK, OHIO.

FRUIT-PICKER.

SPECIFICATION forming part of Letters Patent No. 505,556, dated September 26, 1893.

Application filed January 5, 1893. Serial No. 457,315. (No model.)

*To all whom it may concern:*

Be it known that we, CHARLES LEE and CHARLES L. LEE, Jr., citizens of the United States, residing at Burbank, in the county of Wayne, State of Ohio, have invented certain new and useful Improvements in Fruit-Pickers, of which the following is a specification, reference being had therein to the accompanying drawings.

This invention relates to certain new and useful improvements in fruit pickers of that class in which is employed a support or pole, a tube or flexible chute, and spring-actuated knives or devices for severing the stem of the fruit from the tree in such a way that the fruit falls through the tube or chute to the ground or into a suitable receptacle.

It has for its object among others to provide a simplified and cheap construction whereby better results are attained and the device is rendered more durable and less liable to get out of order.

Our improved fruit picker consists essentially of a plate or bar carrying a ring from which is supported the chute or tube, gripping devices or wires the ends of which are peculiarly constructed, and a pull-rod spring-actuated and connected with the crank-ends of said gripping devices or wires. The crank ends of the said wires are journaled in the upper end of the plate or bar and are crossed in order to secure the best results.

Other objects and advantages of the invention will hereinafter appear and the novel features thereof will be specifically defined by the appended claims.

The invention is clearly illustrated in the accompanying drawings, which, with the letters of reference marked thereon, form a part of this specification and in which—

Figure 1 is a perspective view of our improved fruit picker. Fig. 2 is a detail in elevation of the ring and the gripping devices.

Like letters of reference indicate like parts in both of the views.

Referring now to the details of the drawings by letter, A designates a support or pole, to the upper end of which is affixed in any suitable manner the plate or bar A' which is extended above or beyond the end of the pole or support for a purpose which will soon be made apparent.

B is a ring firmly secured to the extended end of the plate or bar A' and to this ring is secured in any suitable manner a tube or chute C of any suitable material and form, preferably of canvas and which may be of any desired size and length; it may be held to the pole or support at a point or points below its attachment to the ring, or it may hang loosely so as to be extended in an inclined direction relatively to the pole if desired.

The plate or bar A' is provided with perforated lugs $a$ between its ends upon its outer face and in these lugs is mounted to loosely reciprocate the rod D the lower end of which projects beyond the bottom lug and has attached thereto the cord or string E which is provided for the purpose of actuating the grippers as will hereinafter appear. The upper end projects sufficiently beyond the upper lug to guard against any possibility of accidental displacement of the rod. On the rod below the upper lug is a collar $a'$ which serves to limit the upward movement of the rod by engagement with the under side of the said upper lug.

F are the grippers, each composed of a piece of material preferably wire having one end sprung into and removably held in an opening $b$ in a plate B' which is secured to the outer face of the ring B diametrically opposite the upper end of the plate or bar A' as seen in Fig. 1, and the other end passed through openings $a^2$ in the extended end of the plate or bar A', the portion of each wire between the bearings being substantially semi-circular and adapted to rest upon the upper edge of the ring B as seen in Fig. 1. After passing through the openings in the plate or bar A' the wires are bent as at $f$ and their ends thereby crossed and forming crank arms the ends of which are connected to the rods or links G by loose connections so as to permit of free movement of the parts, as for instance by forming eyes or loops upon the ends of the wires and rods or links. The other ends of these rods or links are formed with eyes $g$ which are loosely sleeved upon the rod D below the collar $a'$ thereof as shown and the spring H is arranged around the said rod D between the lower lug *a* and the under face of the lower eye of the link G as seen in both of the views.

By the construction shown we obtain great leverage on the grippers so that we can easily pluck fruit at a great height and the grippers rapidly recede to their normal or open position as soon as strain upon the operating cord is released.

The operation will be readily understood from the foregoing description when taken in connection with the annexed drawings, and a further detailed description thereof is not deemed necessary.

What we claim as new is—

1. In a fruit picker, the combination of the pole, the plate thereon, the ring on the plate, the flexible chute flexibly supported from said ring, the independently pivoted and disconnected spring wire grippers having crank portions extended beyond their pivots at one end and disconnected from each other, the rod movable in guides on the plate, the links having eyes loosely embracing the rod and their other ends connected with the crank arm of the grippers and a spring around the rod between the lower guide and the eye of one of the links, substantially as shown and described.

2. In a fruit picker, the combination of the pole, the plate thereon, the ring on the plate, the flexible chute flexibly supported from said ring, the independently pivoted and disconnected spring wire grippers having crank portions extended beyond their pivots at one end and disconnected from each other, the rod movable in guides on the plate, the links having eyes loosely embracing the rod and their other ends connected with the crank arm of the grippers and a spring around the rod between the lower guide and the eye of one of the links and the collar fixed on said rod between the upper guide and the eye of one of the links, substantially as specified.

3. In a fruit picker, the combination with the poles and the plate thereon, of the ring fast to said plate, the flexible chute, flexibly suspended from said ring, the lug on the outer face of the ring opposite the plate and extended above the ring, the spring wire grippers each independent of the other with one end of each held loosely in said lug independent of the other and the other end passed through the plate above the ring and bent to cross each other without contact and extended to form crank arms extending outward, the rod movable in guides on the plates, the links having horizontal portions with eyes loosely sleeved on said rod below the upper guide and extended outwardly with their upper ends pivotally connected with the ends of the crank arms and the spring around the rod between the lower guide and the lowermost eye of the links, substantially as specified.

In testimony whereof we affix our signatures in presence of two witnesses.

CHARLES LEE.
CHARLES L. LEE, JR.

Witnesses:
 M. H. DODD,
 MARY R. DODD.